United States Patent
Jeong et al.

(10) Patent No.: US 9,544,536 B2
(45) Date of Patent: Jan. 10, 2017

(54) VIDEO CALL METHOD IN PACKET-SWITCHED NETWORK AND DEVICE SUPPORTING THE SAME

(71) Applicant: Samsung Electronics Co., Ltd., Suwon-si (KR)

(72) Inventors: Wook Hyun Jeong, Suwon-si (KR); Sang Mook Kim, Anyang-si (KR); Jin Woo You, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 14/952,542

(22) Filed: Nov. 25, 2015

(65) Prior Publication Data

US 2016/0150181 A1 May 26, 2016

(30) Foreign Application Priority Data

Nov. 25, 2014 (KR) .................. 10-2014-0165531

(51) Int. Cl.
| | |
|---|---|
| *H04N 7/15* | (2006.01) |
| *H04N 7/14* | (2006.01) |
| *H04L 29/06* | (2006.01) |
| *H04N 21/258* | (2011.01) |
| *H04N 21/4402* | (2011.01) |
| *H04N 21/4788* | (2011.01) |
| *H04W 76/02* | (2009.01) |

(52) U.S. Cl.
CPC .............. *H04N 7/14* (2013.01); *H04L 65/602* (2013.01); *H04N 21/25833* (2013.01); *H04N 21/4402* (2013.01); *H04N 21/4788* (2013.01); *H04W 76/028* (2013.01); *H04W 76/026* (2013.01)

(58) Field of Classification Search
USPC ....................................... 348/14.02
See application file for complete search history.

(56) References Cited

U.S. PATENT DOCUMENTS

| | | | |
|---|---|---|---|
| 8,811,421 B2 | 8/2014 | Su et al. | |
| 9,125,240 B2 | 9/2015 | Su et al. | |
| 2010/0153574 A1 | 6/2010 | Lee et al. | |
| 2013/0215846 A1* | 8/2013 | Yerrabommanahalli | H04W 48/18 370/329 |
| 2013/0267267 A1* | 10/2013 | Mujtaba ............ | H04W 36/0066 455/509 |
| 2013/0303168 A1 | 11/2013 | Aminzadeh Gohari et al. | |

(Continued)

FOREIGN PATENT DOCUMENTS

WO     2012177763 A2     12/2012

OTHER PUBLICATIONS

European Search Report for Application No. 15196050 dated Jan. 19, 2016.

*Primary Examiner* — Creighton Smith
(74) *Attorney, Agent, or Firm* — McAndrews, Held & Malloy, Ltd.

(57) ABSTRACT

An electronic device including a communication module configured to connect a packet based video call to a user equipment, an image processing module configured to generate a transmission image for the video call, and a control module configured to control a frame type of a transmission image generated by the image processing module based on tune-away information received from the user equipment.

20 Claims, 9 Drawing Sheets

(56) References Cited

U.S. PATENT DOCUMENTS

| | | | |
|---|---|---|---|
| 2013/0331057 A1* | 12/2013 | Kodali | H04W 76/027 |
| | | | 455/404.1 |
| 2014/0004849 A1 | 1/2014 | Su et al. | |
| 2014/0080479 A1* | 3/2014 | Vangala | H04W 76/028 |
| | | | 455/424 |
| 2014/0086209 A1 | 3/2014 | Su et al. | |
| 2014/0119293 A1 | 5/2014 | Sikri et al. | |
| 2014/0355505 A1 | 12/2014 | Su et al. | |
| 2015/0341897 A1* | 11/2015 | Zhu | H04W 68/005 |
| | | | 370/331 |

* cited by examiner

VIDEO CALL METHOD IN PACKET-SWITCHED NETWORK AND DEVICE SUPPORTING THE SAME

RELATED APPLICATION(S)

This application claims the benefit under 35 U.S.C. §119(a) of a Korean patent application filed on Nov. 25, 2014 in the Korean Intellectual Property Office and assigned Serial number 10-2014-0165531, the entire disclosure of which is hereby incorporated by reference.

BACKGROUND

The present disclosure relates to video call quality between terminals using a Packet-Switched (PS) network, and more particularly to alleviating video degradation during a video call.

Unlike a Circuit-Switched (CS) 2G or 3G network, Long-Term Evolution (LTE) (post-4G communication protocol) supports PS network. However, even with LTE, voice calls can still use 3G networks. For example, if a voice call is received while a User Equipment (UE) is accessing a 4G network, a Circuit Switched Fall-Back (CSFB) technique will disconnect from the 4G network and connect to a 3G network.

Additionally, Voice over LTE (VoLTE) supports high-quality voice calls in a broader bandwidth of LTE and VoLTE based video calls with high definition (HD) video quality (1280×720 pixels, 30 fps) is also supported. The HD video quality is better than the quality in an existing CS video call (for example, Common Intermediate Format (CIF) 353×288 pixels, 15 fps).

The CSFB technique is a method of making voice calls where a mobile communication carrier inserts CS call paging information between LTE signals in a core network and provides it to a UE. However, with Single Radio LTE (SRLTE) UE, when the UE checks 3G network for CS paging information (tune-away) the SRLTE UE must stop communicating on the LTE network. Accordingly, LTE data throughput may deteriorate during the tune-away periods on an SRLTE UE.

According to the 3rd Generation Partnership Project (3GPP) TS 44.018 specifications, a CS paging period may have a minimum time of 470 ms and a maximum time of 2.12 s. The CS paging period is determined by the parameter BS_PA_FRMS set in each CELL. In each CS paging period, the LTE connection is disconnected from about 15 ms to about 30 ms to tune-away for the UE to receive and parse a paging message. That is, in the case of a terminal supporting a SRLTE method, during a video call using VoLTE the video quality may deteriorate due to the 15-30 ms tune-away every 470 ms~2.12 s.

SUMMARY

Accordingly, an aspect of the present disclosure is to provide a method and device for providing a video call between terminals with compensation for data throughput deterioration occurring due to tune-away to minimize video quality deterioration.

In accordance with an aspect of the present disclosure, an electronic device may include a communication module configured to connect a packet based video call to a user equipment, an image processing module configured to generate a transmission image for the video call, and a control module configured to control a frame type of the transmission image generated by the image processing module based on tune-away information received from the user equipment.

DETAILED DESCRIPTION

Figure 1:
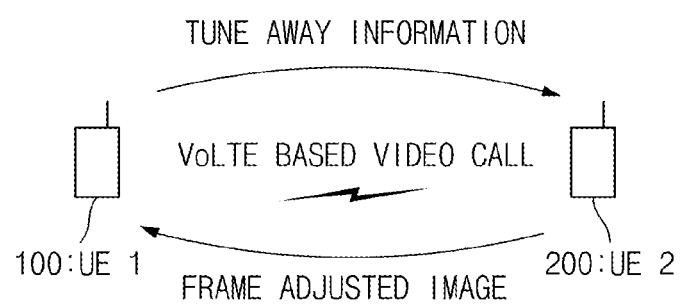
FIG. 1 is a conceptual diagram illustrating an image frame adjustment method for a video call in a packet based network according to various embodiments of the present disclosure.

Hereinafter, various embodiments of the present disclosure are disclosed with reference to the accompanying drawings. However, this does not limit various embodiments of the present disclosure to a specific embodiment and it should be understood that the present disclosure covers all modifications, equivalents, and/or alternatives of this disclosure provided they come within the scope of the appended claims and their equivalents. With respect to the descriptions of the drawings, like reference numerals refer to like elements.

Each term "include", "comprise", "have", "may include", "may comprise" or "may have" used herein indicates disclosed functions, operations, or existence of elements but does not exclude other functions, operations or elements.

Generally, the phrase "A and/or B" indicates choice of selecting just A, just B, or both A and B. Similarly, the phrase "A, B, and/or C" indicates a choice of selecting any combination of A, B, and C, starting with just A, just B, just C, . . . to A and B and C.

Terms such as "1st", "2nd", "first", "second", and the like used herein may refer to modifying various different elements of various embodiments of the present disclosure, but do not limit the elements. For instance, "a first user device" and "a second user device" may indicate different user devices and not necessarily the order or the importance.

In various embodiments of the present disclosure, it will be understood that when a component (for example, a first component) is referred to as being "(operatively or communicatively) coupled with/to" or "connected to" another component (for example, a second component), the component may be directly connected to the other component or connected through another component (for example, a third component). In various embodiments of the present disclosure, it will be understood that when a component (for example, a first component) is referred to as being "directly connected to" or "directly access" another component (for example, a second component), another component (for example, a third component) does not exist between the component (for example, the first component) and the other component (for example, the second component).

The expression "configured to" as used in this disclosure may be interchangeably used with "suitable for", "having the capacity to", "designed to", "adapted to", "made to", or "capable of" according to a situation. The expression "a device configured to perform XYZ" in some situations may mean that the device is "capable of performing XYZ".

Various terms used in the present disclosure are used to describe some embodiments of the present disclosure, and are not intended to limit the scope of other embodiments. Terms of a singular form may include plural forms unless they have a clearly different meaning in the context or are specifically limited to the singular meaning. Unless indicated otherwise herein, all terms used herein, which include technical or scientific terms, have the same meaning that is generally understood by a person skilled in the art. In general, terms defined in the dictionary should be considered to have the same meaning as the contextual meaning of the related art, and, unless clearly defined herein, should not be understood abnormally or as having an excessively formal meaning. In any cases, terms defined in this specification do not exclude any embodiment of the present disclosure unless specifically stated so.

According to various embodiments of the present disclosure, an electronic device may be, for example, a smartphone, a tablet personal computer (PC), a mobile phone, a video phone, an electronic book (e-book) reader, a desktop personal computer (PC), a laptop personal computer (PC), a netbook computer, a workstation server, a personal digital assistant (PDA), a portable multimedia player (PMP), a MP3 player, a mobile medical device, a camera, or any wearable device such as, for example, a smart glass, a head-mounted-device (HMDs), an electronic apparel, an electronic bracelet, an electronic necklace, an electronic appcessory, an electronic tattoo, a smart mirror, or a smart watch.

According to some embodiments of the present disclosure, an electronic device may be a smart home appliance. The smart home appliance may be, for example, a television, a digital video disk (DVD) player, an audio device, a refrigerator, an air conditioner, a cleaner, an oven, a microwave oven, a washing machine, an air cleaner, a set-top box, a home automation control panel, a security control panel, a TV box (e.g., Samsung HomeSync™, Apple TV™ or Google TV™), a game console (for example, Xbox™ and PlayStation™), an electronic dictionary, an electronic key, a camcorder, or an electronic picture frame.

According to some embodiments of the present disclosure, an electronic device may be, for example, one of various measurement devices (for example, glucometers, heart rate meters, blood pressure meters, temperature meters, etc.), magnetic resonance angiography (MRA) devices, magnetic resonance imaging (MRI) devices, computed tomography (CT) devices, medical imaging devices, ultrasonic devices, etc., navigation devices, global positioning system (GPS) receivers, event data recorders (EDRs), flight data recorders (FDRs), vehicle infotainment devices, marine electronic equipment (for example, marine navigation systems, gyro compasses, etc.), avionics, security equipment, vehicle head units, industrial or household robots, financial institutions' automatic teller machines (ATMs), a store's point of sales (POS), or internet of things (for example, bulbs, various sensors, electric or gas meters, sprinkler systems, fire alarms, thermostats, street lights, toasters, exercise equipment, hot water tanks, heaters, boilers, etc.).

In various embodiments of the present disclosure, an electronic device may include at least one of part of furniture or buildings/structures supporting call forwarding service, electronic boards, electronic signature receiving devices, projectors, and various instruments to measure, for example, water, electricity, gas, or radio signals. An electronic device according to various embodiments of the present disclosure may be one of the above-mentioned various devices or a combination thereof. Additionally, an electronic device according to an embodiment of the present disclosure may be a flexible electronic device. Additionally, an electronic device according to an embodiment of the present disclosure is not limited to the above-mentioned devices, and also may include a new kind of electronic device not yet developed.

Hereinafter, an electronic device according to various embodiments of the present disclosure will be described in more detail with reference to the accompanying drawings. The term "user" in this disclosure may refer to a person using an electronic device or a device using an electronic device (for example, an artificial intelligent electronic device).

FIG. 1 is a conceptual diagram illustrating an image frame adjustment method for a video call in a packet based network according to various embodiments of the present disclosure.

Referring to FIG. 1, a first user equipment (or UE 1) 100 and a second user equipment (or UE 2) 200 may be performing a VoLTE based video call. Although an exemplary VoLTE based video call is shown in FIG. 1, a video call in any manner using an LTE or PS system may correspond to a video call according to various embodiments of the present disclosure. For example, it is understood that a video call (for example, FaceTime) supported by a chatting application, a social network application, or a terminal itself may be one example of a VoLTE based video call shown in FIG. 1.

According to various embodiments of the present disclosure, the first user equipment 100 and the second user equipment 200 may be the same type of terminals or may be terminals supporting the same or compatible communication method. For example, the user equipments 100 and 200 may support a SRLTE method. In another example, the user equipments 100 and 200 may support Single Radio Dual Standby (SRDS) method. In general, the user equipments 100 and 200 may be terminals that communicate by using an LTE network (for example, a PS domain) and a 3G network (or a network using a CS domain such as 2G network and GSM network) and uses the tune-away method to search for call paging of a CS domain. The present disclosure describes a terminal for supporting SRLTE and SRDS methods but this does not limit the range of this present disclosure. Each method will be described with reference to FIG. 3.

According to various embodiments of the present disclosure, description for the first user equipment 100 may be applied to the second user equipment 200. In the same manner, description for the second user equipment 200 may be applied to the first user equipment 100. For example, in FIG. 1, if the first user equipment 100 performs an operation for checking CS call paging information using the tune-away method, the second user equipment 200 operates in the same manner also. For example, during a video call between the user equipments 100 and 200, the second user equipment 200 may adjust a frame of a transmission image transmitted for a video call based on tune-away information received from the first user equipment 100. Similarly, the first user equipment 100 in a video call with the second user equipment 200 may control a provided image frame based on tune-away information from the second user equipment 200. Hereinafter, operations of the second user equipment 200 will be described with reference to FIG. 2.

Figure 2:
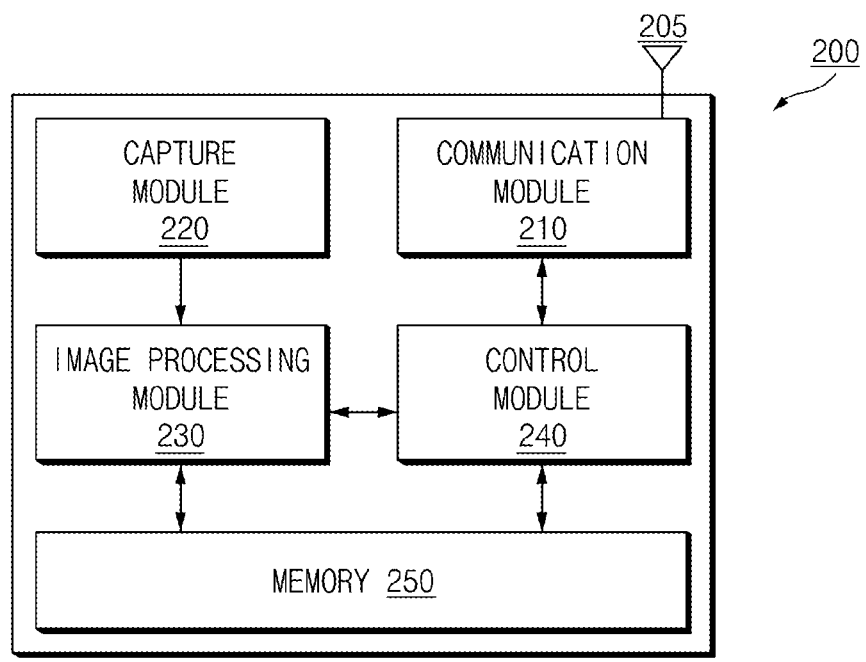
FIG. 2 is a view illustrating a configuration of a terminal for controlling transmission image frames according to various embodiments of the present disclosure.

FIG. 2 is a view illustrating a configuration of a terminal for controlling a transmission image frame according to various embodiments of the present disclosure.

Referring to FIG. 2, the second user equipment 200 may be similar to the second user equipment 200 shown in FIG. 1 and may include an antenna 205, a communication module 210, a capture module 220, an image processing module 230, a control module 240, and a memory 250. Hereinafter, the second user equipment 200 may be abbreviated simply as a terminal 200.

FIG. 2 illustrates components of the terminal 200 to exemplarily describe various embodiments. Other components may be added or replaced in the level of ordinary skill in the art. For example, the terminal 200 may further include displays for displaying images of a user of the terminal 200 and/or the other party in a video call. An example of a more general configuration of a user terminal will be described later with reference to FIGS. 4 and 8.

The communication module 210 may communicate with another terminal via the antenna 205. For example, the communication module 210 may process signals received or transmitted through at least one antenna 205 (for example, a main transmission/reception antenna, a diversity reception antenna, and so on). The communication module 210 may support a communication method such as 4G using PS domain (for example, LTE, LTE-A, and so on) and a 3G/2G communication method using CS domain (for example, GSM, WCDMA, and so on). Additionally, the communication module 210, for example, may perform a tune-away operation for obtaining CS call paging information. Additionally, the communication module 210 may receive information (for example, tune-away start, end, average length, expected end time, and so on) on a tune-away operation performed by another terminal from that terminal and may transmit information on tune-away performed by the terminal 200 to that terminal.

According to various embodiments of the present disclosure, the communication module 210 may perform a video call (for example, a VoLTE based video call) using PS domain with another terminal. The communication module 210 may transmit the user's voice and image data packets of the terminal 200 to the other terminal. Additionally, the communication module 210 may receive the other user's voice and image data packets from the other terminal.

The capture module 220 may capture and/or process user images for a video call. For example, the capture module 220 may include a front camera of the terminal 200 and a processor (for example, an Image Signal Processor (ISP)) for signal processing. The capture module 220 may provide images obtained by the camera to the image processing module 230.

The image processing module 230 may generate transmission images to be transmitted for a video call. For example, the image processing module 230 may determine the quality or size of a generated transmission image according to an image quality supported by the terminal 200 or a receiving terminal (for example, the first user equipment 100) and a network in use (for example, 4G network, 3G network, WiFi network, and so on). In the case of a HD video call, the image processing module 230 may generate images with, for example, 1280×720 resolution.

According to various embodiments of the present disclosure, the image processing module 230 may determine the frame type of a generated image. For example, an image processing module 230 may configure an arbitrary group of pictures (GOP) for a video call. As is known, the image processing module 230 may generate a key frame, which may also be referred to as an intra frame (I frame). The I frame provides the best quality among frames described in this disclosure but requires the most number of bits per frame.

Another frame type may be a frame based on image information of a previous frame and may be referred to as a predicted frame (P frame). A frame generated based on a previous frame and an after frame may be referred to as a bidirectional frame (B frame). Accordingly, the P frame and B frame refer to at least one other reference frame. Therefore, in this disclosure the P frame and the B frame may be referred to as a "referring frame".

The control module 240 may control overall operation of the terminal 200. The control module 240 may control the frame type of images generated by the image processing module 230 based on tune-away information from the other party's terminal received through the communication module 210. For example, when information is received that the other party's terminal is starting to tune-away, the control module 240 may allow the image processing module 230 to generate transmission images in a P frame. This is just exemplary and is dependent upon a setting of the terminal 200 or the type (for example, whether it is an SRLTE supporting terminal or an SRDS supporting terminal) of the other party's terminal communicating with the terminal 200. The control module 240 may determine the frame type of transmission images generated by the image processing module 230.

According to various embodiments of the present disclosure, the control module 240 and the image processing module 230 may be implemented in one processor or one System on Chip (SoC) or may be configured using an additional hardware module. According to an embodiment of the present disclosure, the SoC may include the above-mentioned ISP.

Images obtained by the capture module 220 or generated by the image processing module 230 may be stored in the memory 250. The memory 250 may comprise volatile and/or non-volatile memories. Additionally, transmission images of the other party received by the communication module 210 may be stored in the memory 250. The control module 240 may decode images received from the other party and may output the decoded images on the display of the terminal 200.

According to various embodiments of the present disclosure, instructions for performing several methods or operations described in this document may be stored in the memory 250. For example, the memory 250 may store instructions for receiving tune-away information from the other party terminal and determining the frame type of transmission images transmitted to the other terminal based on the received tune-away information. The terminal 200 may also store instructions in the memory 250 that may be executed by various modules in the terminal 200. For example, the instructions may be executed to allow transmitting tune-away information to the other party terminal in video call by using a PS system when the communication module 210 performs a tune-away operation for searching for CS paging information.

Hereinafter, an operation for a terminal to provide tune-away information will be described with reference to FIG. 3.

Figure 3:
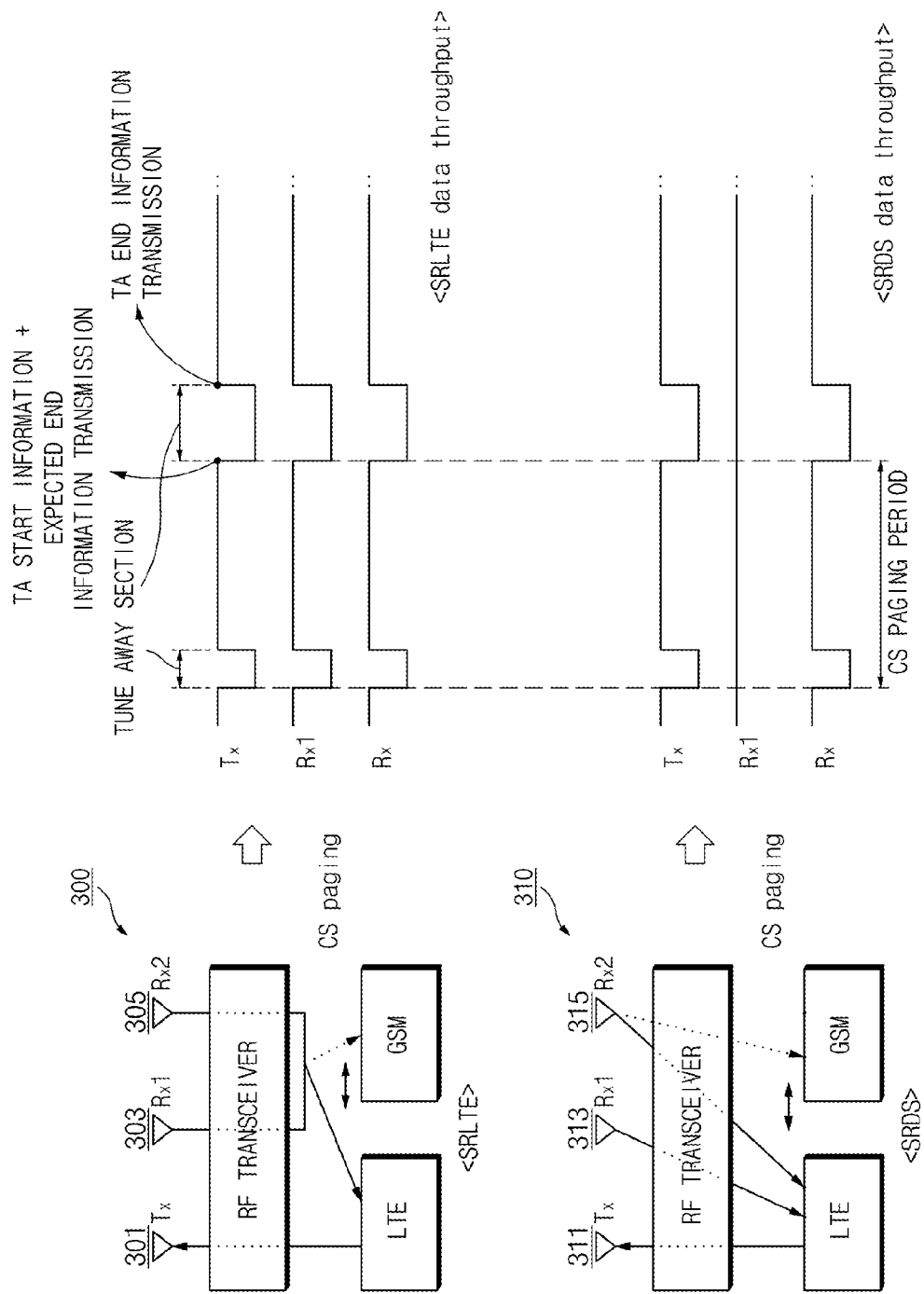
FIG. 3 is a conceptual diagram illustrating tune-away and data throughput according to various embodiments of the present disclosure.

FIG. 3 is a conceptual diagram illustrating tune-away and data throughput according to various embodiments of the present disclosure.

For reference, FIG. 3 shows a configuration of communication modules and a data throughput graph, which are conceptually illustrated for convenience of description. Accordingly, an actual device configuration may be different and the resulting data throughput graph may also be different.

Referring to FIG. 3, an SRLTE terminal 300, for example, may include one transmission antenna Tx 301 and two reception antennas Rx1 303 and Rx2 305. In some embodiments of the present disclosure, the SRLTE terminal 300 may include one transmission/reception antenna Tx/Rx. According to various embodiments of the present disclosure, in support of CS paging, the terminal 300 may tune-away a reception antenna from the PS domain to the CS domain. For example, the terminal 300 may allow a reception antenna to be directed to a GSM network from a LTE network. The period of CS paging may be defined as "51-multi-frame period×BS_PA_MFRMS" in accordance with 3GPP specifications. Herein, the length of a 51 multi frame may be 235.4 ms and a BS_PA_MFRMS value may be provided from a communication carrier network. Typically, BS_PA_MFRMS may have a value between 2 to 9. Accordingly, the minimum value of CS paging period may be about 470 ms and the maximum value may be about 2.12 s.

Since data cannot be received from a LTE network when tune-away occurs during a CS paging period, data throughput may deteriorate. Referring to FIG. 3, it can be seen in the SRLTE data throughput graph that there is no data throughput during tune-away sections (or period). A tune-away period may vary even for a constant BS_PA_MFRMS value because it is possible to return to LTE immediately if there is no CS paging information. However, if there is CS paging information then some time is required for processing the information received from the CS domain.

According to various embodiments of the present disclosure, the terminal 300 may transmit tune-away information to the other party's terminal (for example, the terminal 200) at the time that tune-away starts. For example, when tune-away starts, the terminal 300 may transmit to the other party's terminal the tune-away start information indicating the start of tune-away. According to various embodiments of the present disclosure, the terminal 300 may transmit information on the end expected time or average period of tune-away along with the tune-away start information. Additionally, when tune-away ends, the terminal 300 may transmit to the other party's terminal tune-away end information indicating that tune-away ended.

Referring to FIG. 3, in the case of an SRDS type supporting terminal 310, there is a difference in a CS paging operation and a data throughput in comparison to the SRLTE terminal 300. The terminal 310 may not tune-away all reception antennas at the same time and may perform an operation for receiving CS paging by using one antenna (for example, Rx2 315). In this case, while data throughput at the reception antenna Rx1 313 is maintained, data throughput by the reception antenna Rx2 315 performing tune-away may be deteriorated.

According to various embodiments of the present disclosure, the SRLTE type terminal 300 may not receive data from the PS domain during a tune-away section but the SRDS type terminal 310 may receive data from the PS domain. Accordingly, when receiving tune-away start information from the SRDS type terminal 310 in a video call, the terminal 200 may transmit P frame images from a corresponding time point until tune-away ends (or an end expected time point). Therefore, the SRDS type terminal 310 may still receive a P frame image from the terminal 200 so that it may maintain a video call seamlessly. When receiving tune-away end information, the terminal 200 may generate I frames to transmit them to the terminal 310 so that it may maintain the quality of a video call. According to various embodiments of the present disclosure, when the terminal 200 communicates with the SRLTE support terminal 300, since the terminal 300 cannot receive transmission images from the terminal 200 during a tune-away period, the frame type of transmission images may be different from SRDS. Various embodiments of the present disclosure for determining the frame type of transmission images will be described later with reference to FIGS. 5 to 7. Hereinafter, an exemplary electronic device to which various embodiments of the present disclosure are applicable will be described with reference to FIG. 4.

Figure 4:
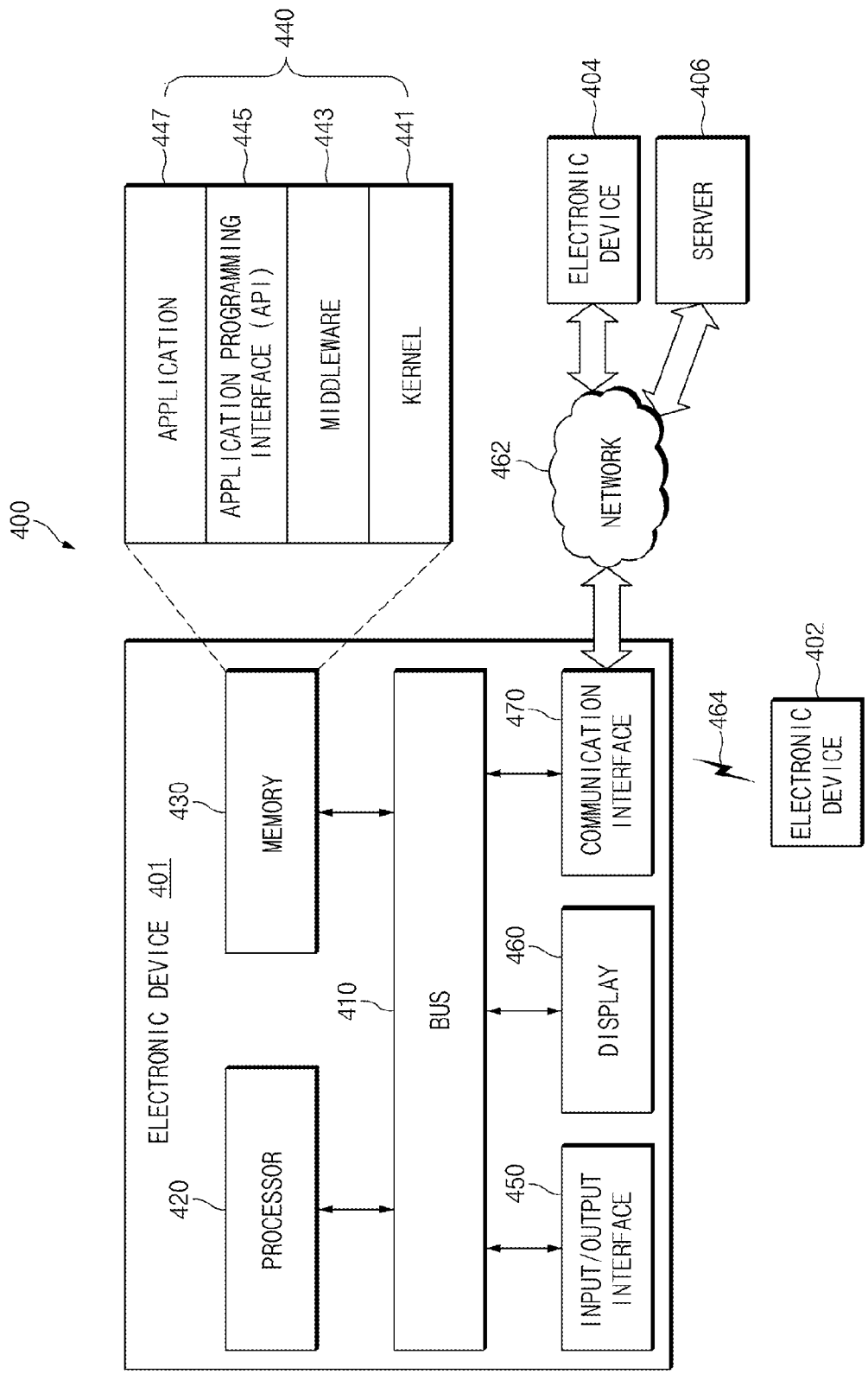
FIG. 4 is a view illustrating an electronic device in a network environment according to various embodiments of the present disclosure.

FIG. 4 is a view illustrating an electronic device in a network environment according to various embodiments of the present disclosure.

Referring to FIG. 4, an electronic device 401 in a network environment 400 is described according to various embodiments of the present disclosure. The electronic device 401 may correspond to one of the above-mentioned terminals 100, 200, 300, or 310. The electronic device 401 may include a bus 410, a processor 420, a memory 430, an input/output interface 450, a display 460, and a communication interface 470. According to an embodiment of the present disclosure, the electronic device 401 may omit at least one of the components or may additionally include a different component. This may be done, for example, by combining functions of components or separating functions of a component. Additionally, functions may be added or removed in an electronic device.

The bus 410, for example, may include a circuit for connecting the components 410 to 470 to each other and delivering a communication (for example, control message and/or data) therebetween.

The processor 420 may include at least one of, for example, a central processing unit (CPU), an Application Processor (AP), and a communication processor (CP). For example, the processor 420 may correspond at least to the control module 240 of FIG. 2, or may correspond to the control module 240, the image processing module 230, and other calculation devices of FIG. 2. Additionally, the processor 420, for example, may execute calculation or data processing for control and/or communication of at least one another component of the electronic device 401.

The memory 430 may include volatile and/or nonvolatile memory. The memory 430 may correspond to the memory 250 of FIG. 2, for example. The memory 430 may store instructions and/or data relating to at least one another component of the electronic device 401. According to an embodiment of the present disclosure, the memory 430 may store software and/or program 440. The programs 440 may include a kernel 441, a middleware 443, an application programming interface (API) 445, and/or an application program (or an application) 447. At least part of the kernel 441, the middleware 443, or the API 445 may be called an operating system (OS).

The kernel 441, for example, may control or manage system resources (for example, the bus 410, the processor 420, the memory 430, and so on) used for performing operations or functions implemented in other programs (for example, the middleware 443, the API 445, or the application program 447). Additionally, the kernel 441 may provide an interface for controlling or managing system resources by accessing an individual component of the electronic device 401 from the middleware 443, the API 445, or the application program 447.

The middleware 443, for example, may serve an intermediary role for exchanging data as the API 445 or the application program 447 communicates with the kernel 441.

Additionally, the middleware 443 may process job request(s) received from the application program 447. For example, the middleware 443 may assign to at least one application program 447 priority for using a system resource(s) (for example, the bus 410, the processor 420, and/or the memory 430) of the electronic device 401. For example, the middleware 443 may perform scheduling or load balancing according to the priority assigned to the job request(s).

The API 445, as an interface for allowing the application program 447 to access functions in the kernel 441 or the middleware 443, may include at least one interface or function (for example, an instruction) for file control, window control, image processing, or character control.

The input/output interface 450 may serve as an interface for delivering instructions or data inputted from a user or another external device to another component(s) of the electronic device 401. Additionally, the input/output interface 450 may output instructions or data received from another component(s) of the electronic device 401 to a user or another external device.

The display 460 may include, for example, a liquid crystal display (LCD), a light emitting diode (LED) display, an organic light emitting diode (OLED) display, a microelectromechanical systems (MEMS) display, or an electronic paper display. The display 460 may display various contents (for example, text, image, video, icon, symbol, and so on) to a user. The display 460 may include, for example, a touch screen that can receive a touch, gesture, proximity, or hovering input by using an electronic pen or a user's body part.

The communication interface 470 may enable communication between the electronic device 401 and an external device (for example, the first external electronic device 402, the second external electronic device 404, or the server 406). For example, the communication interface 470 may communicate with an external device 404 via the network 462 using wireless communication or wired communication.

The wireless communication may use at least one of, for example, LTE, LTE-A, CDMA, WCDMA, UMTS, WiBro, and GSM as a cellular communication protocol. For example, the communication interface 470 may support at least one of a PS type network and a CS type network among the above-mentioned communication methods. Additionally, the wireless communication may include a short-range communication 464. The short range communication 464 may include at least one of, for example, wireless fidelity (WiFi), Bluetooth (BT), near field communication (NFC), global positioning system (GPS), and so on. The wired communication may include at least one of, for example, universal serial bus (USB), high definition multimedia interface (HDMI), recommended standard 832 (RS-232), and plain old telephone service (POTS). The network 462 may include at least one communications network such as, for example, computer network (for example, LAN or WAN), internet, and telephone network.

Each of the first and second external electronic devices 402 and 404 may be the same or different type as the electronic device 401. According to an embodiment of the present disclosure, the server 406 may include a group of one or more servers. According to various embodiments of the present disclosure, all or part of operations executed on the electronic device 401 may be executed on another one or more electronic devices (for example, the electronic device 402 or 404 or the server 406). According to an embodiment of the present disclosure, when the electronic device 401 performs a certain function or service automatically or by a request, it may request at least part of a function relating thereto be executed on another device (for example, the electronic device 402 or 404 or the server 406) instead of or in addition to executing the function or service by itself. The other electronic device (for example, the external electronic device 402 or 404 or the server 406) may execute the requested function and/or an additional function and may deliver an execution result to the electronic device 401. The electronic device 401 may provide the requested function or service. Accordingly, for example, cloud computing, distributed computing, or client-server computing technology may be used.

According to various embodiments of the present disclosure, an electronic device may include a communication module configured to connect a packet based video call to a user equipment, an image processing module configured to generate a transmission image for the video call, and a control module configured to control a frame type of a transmission image generated by the image processing module based on tune-away information received from the user equipment.

According to various embodiments of the present disclosure, the tune-away information may include tune-away start information of the user equipment and the control module generates a transmission image in predicted frame type from a time point of obtaining the start information.

According to various embodiments of the present disclosure, the tune-away information may include tune-away end information of the user equipment and the control module may generate an image in key frame type to transmit the generated image to the user equipment when the end information is obtained. Additionally, the control module may generate the image in key frame type when the expected end time elapses.

According to various embodiments of the present disclosure, the tune-away information may include information on a tune-away average end time of the user equipment and the control module may generate the image in key frame type when the average end time elapses.

Additionally, the control module may generate an image in a predicted frame type after generating the key frame type.

According to various embodiments of the present disclosure, the tune-away information may include tune-away start information of the user equipment and information on the user equipment and when the user equipment is a Single Radio LTE (SRLTE) supporting terminal, the control module may generate a transmission image in key frame type from a time point of obtaining the start information.

Additionally, when receiving end information of the tune-away from the user equipment, the control module may generate a transmission image in key frame type to transmit the generated transmission image to the user equipment and generate a transmission image in a referring frame type after the transmission.

According to various embodiments of the present disclosure, the tune-away information may include the tune-away start information of the user equipment and information on the user equipment, and when the user equipment is a Single Radio Dual Standby (SRDS) supporting terminal, the control module may generate a transmission image in referring frame type from a time point of obtaining the start information.

According to various embodiments of the present disclosure, when the user equipment is an SRDS supporting terminal, if an expected end time of the tune-away elapses or end information of the tune-away is received, the control module may generate a transmission image in key frame type to transmit the generated transmission image to the user equipment.

Figure 5:
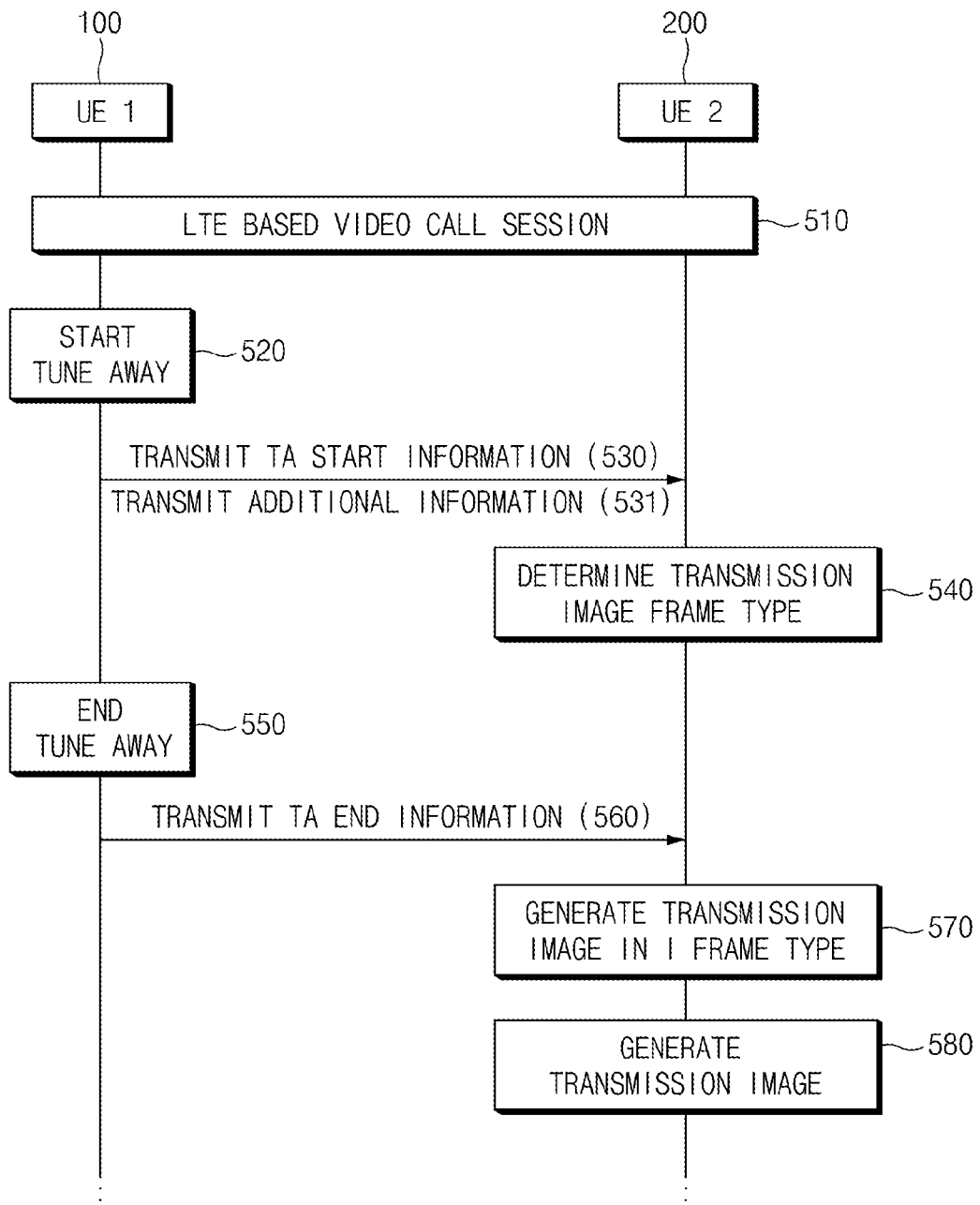
FIG. 5 is a view illustrating a video call method between user equipments according to various embodiments of the present disclosure.

FIG. 5 is a view illustrating a video call method between user equipments according to various embodiments of the present disclosure. FIG. 5 is understood as an operation performed during packet based video call (for example, a VoLTE based video call) between the first user equipment 100 (hereinafter referred to as the terminal 100) and the second user equipment 200 (hereinafter referred to as the terminal 200).

In operation 510, an LTE based video call session may be established between the terminal 100 and the terminal 200. The terminal 100 and the terminal 200 may continuously exchange voice and image data packets for a video call with each other.

In operation 520, the terminal 100 may start a tune-away operation for receiving CS paging. Although it is shown in FIG. 5 that the terminal 100 performs a tune-away operation, both the terminal 100 and the terminal 200 may perform the tune-away operation. For example, if the terminal 100 and the terminal 200 are terminals supporting both SRLTE and SRDS, they may perform a tune-away operation. If the terminal 100 is an SRLTE supporting terminal and the terminal 200 is a terminal that does not require a tune-away operation (for example, a dual radio LTE supporting terminal such as a Simultaneous Voice and LTE (SVLTE) terminal), only the terminal 100 performs a tune-away operation and the terminal 200 controls only the frame type of images transmitted to the terminal 100.

In operation 530, with the start of a tune-away operation (for example, at the same time or just before the start), the terminal 100 may transmit tune-away start information to the terminal 200. According to various embodiments of the present disclosure, in operation 531, the terminal 100 may transmit additional information (for example, information on a tune-away expected end time point, an average tune-away period, the minimum tune-away period, and so on) together with tune-away start information.

In operation 540, when receiving tune-away information, the terminal 200 may determine the frame type of transmission images to be transmitted to the terminal 100 for the video call. For example, when receiving information that tune-away starts from the terminal 100, the terminal 200 may expect deterioration of data throughput of the terminal 100 and may determine to encode transmission images with a predicted frame (P frame) of a relatively smaller number of bits.

According to various embodiments of the present disclosure, the terminal 200 may encode transmission images in a different method according to additional information or the type of the terminal 100. Each example will be described with reference to FIGS. 6 and 7.

In operation 550, a tune-away operation performed in the terminal 100 is terminated and it is possible to return to LTE network. In operation 560, the terminal 100 may transmit information that tune-away ends to the terminal 200.

When receiving the information that the tune-away of the terminal 100 ends, the terminal 200 may generate transmission images in a key frame (for example, an I frame) type and transmit them to the terminal 100 in operation 570. Once key frames are generated and transmitted after tune-away, transmission images are generated through a general method (for example, referring frames are generated to configure a GOP after the key frames) so that a video call may be continued.

According to various embodiments of the present disclosure, it may be assumed that a period of CS paging of the terminal 100 is 940 ms, tune-away is 100 ms, and the terminal 100 and the terminal 200 are in a HD quality video call with a resolution of 1280×720, the terminal 100 and the terminal 200 transmit/receive images to/from each other at 30 frame per sec (fps). That is, terminal 200 may transmit data corresponding to 30 images per second to the terminal 100 and it may take about 33 ms to transmit data corresponding to one image. When receiving tune-away start information from the terminal 100, the terminal 200 may generate an image with P frame and transmit it to the terminal 100. Since tune-away lasts about 100 ms, until receiving a notification that tune-away ends from the terminal 100, the terminal 200 may transmit three P frame images during the 100 ms. When receiving a tune-away end notification, the terminal 200 may generate an image of I frame type to transmit it to the terminal 100 immediately.

If the terminal 100 is an SRDS supporting terminal, even if the deterioration of data throughput occurs, the terminal 100 may maintain the quality of a video call continuously by using the P frame received from the terminal 200 in a tune-away section.

When the terminal 100 is an SRLTE supporting terminal, it may not receive images from the terminal 200 during a tune-away section. That is, even when P frame and I frame are transmitted, corresponding frame losses may occur. However, according to various embodiments of the present disclosure, the terminal 200 may generate P frame to provide it to the terminal 100 when receiving tune-away start information, and the terminal 100 may receive P frame between a time point at which tune-away ends actually and a time point at which tune-away end information arrives at the terminal 200. For example, in the above-mentioned embodiment, the first two of three P frame transmitted from the terminal 200 may not be received by the terminal 100. The third P frame may be received by the terminal 100. The terminal 100 may maintain the quality of a video call at a predetermined level by utilizing the received P frame based on I frames received before tune-away. Furthermore, the terminal 100 may provide tune-away end information to the terminal 200, and the terminal 200 may generate a new I frame immediately at a time point of receiving the tune-away end information to transmit it to the terminal 100. The terminal 100 may thereby maintain an original quality for the video call.

Figure 6:
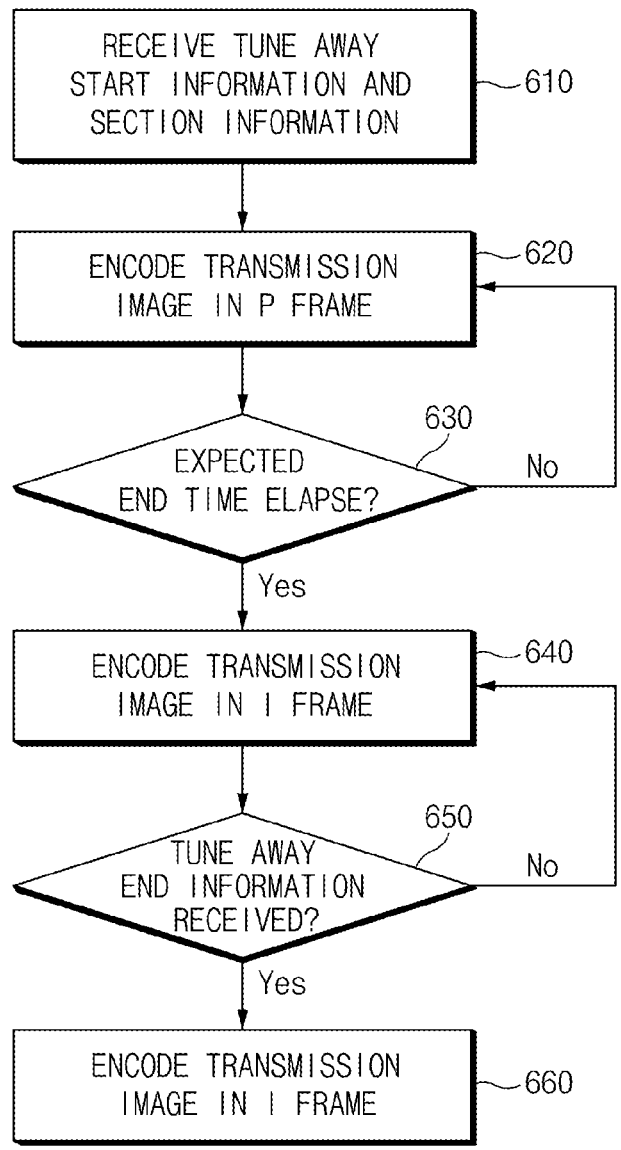
FIG. 6 is a flowchart illustrating a method of determining transmission image frames using additional information according to various embodiments of the present disclosure.

FIG. 6 is a flowchart illustrating a method of determining transmission image frame by using additional information according to various embodiments of the present disclosure.

Referring to FIG. 6, in operation 610, the terminal 200 may receive additional information such as tune-away start information and tune-away section information together from the terminal 100. For example, the additional information may include the expected tune-away end time point, average tune-away period, and minimum tune-away period of the terminal 100. According to various embodiments of the present disclosure, the terminal 100 may transmit tune-away start information and average tune-away period information together and the terminal 200 may utilize the average tune-away period as the expected end time point of the tune-away.

In operation 620, when receiving tune-away information, the terminal 200 may encode transmission images as a referring frame (for example, P frame). In operation 630, the terminal 200 may determine whether an expected end time point elapses and may repeat operation 620 until the expected end time point elapses.

In operation 640, if the expected end time elapses, the terminal 200 may encode transmission images as key frames (for example, I frame). Accordingly, the terminal 200 may generate and transmit I frames even before receiving a tune-away end notification from the terminal 100. The terminal 100 may, therefore, receive I frames before notification of tune-away end arrives at the terminal 200, thereby maintaining the quality of a video call by using a key frame more quickly. According to various embodiments of the present disclosure, in the case of a 30 fps transmission rate, one or two I frames may be transmitted between an expected end time point and an actual end time point of tune-away.

In operation 650, the terminal 200 may determine whether tune-away end information is received from the terminal 100 and if it is received, may encode transmission images as I frames. The I frame images generated in operation 640 may be lost if the data throughput of the terminal 100 is not recovered, but since the I frame corresponding to operation 660 is the I frame transmitted after tune-away ends, it is transmitted to the terminal 100 normally and used for a video call. After operation 660, the terminal 200 may maintain a video call continuously in a general method.

Figure 7:
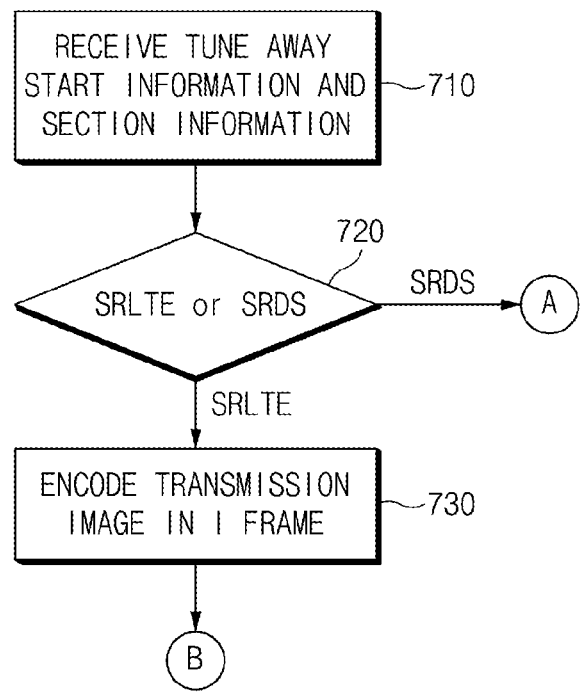
FIG. 7 is a flowchart illustrating a method of determining transmission image frames depending on the other party terminal according to various embodiments of the present disclosure.

FIG. 7 is a flowchart illustrating a method of determining a transmission image frame depending on the other party terminal according to various embodiments of the present disclosure.

Referring to FIG. 7, in operation 710, the terminal 200 may receive additional information such as tune-away start information and tune-away section information together from the terminal 100. In the embodiment of FIG. 7, the additional information may include information on a communication method (or a tune-away method) supported by the terminal 100. According to various embodiments of the present disclosure, the terminal 100 and the terminal 200 may exchange such information with each other when setting up a video call session. This may happen, for example, in advance in operation 510 of FIG. 5.

In operation 720, the terminal 200 may determine whether the other party terminal, for example, the terminal 100, uses SRLTE method or SRDS method. The terminal 200 may determine a communication method (for example, a tune-away method) of the other party terminal by using information obtained in advance or information received in operation 710. If the other party terminal uses the SRDS method, the terminal 200 may perform operation(s) A, for example, operations 540 through 580 of FIG. 5 (in this case, operations 550 and 560 are performed by the terminal 100) or operations 620 through 660 of FIG. 6.

According to various embodiments of the present disclosure, if the terminal 100 uses the SRLTE method, even when the terminal 200 generates an image with P frame and transmits it, since the terminal 100 cannot receive a corresponding image during a tune-away section, in order for I frame to be received as soon as the tune-away of the terminal 100 ends, the terminal 200 may generate an image with I frame and transmit it immediately in operation 730. For example, the terminal 200 may perform operation(s) B, for example, operations 570 and 580 of FIG. 5 or operations 640, 650, and 660 of FIG. 6.

According to various embodiments of the present disclosure, a video call method may include connecting a packet based video call to a user equipment, receiving tune-away information from the user equipment, and determining a frame type of a transmission image transmitted to the user equipment based on the received tune-away information.

According to various embodiments of the present disclosure, the receiving of the tune-away information may include receiving tune-away start information of the user equipment and the determining of the frame type may include determining a predicted frame type as a frame type of a transmission image when the tune-away start information is received.

According to various embodiments of the present disclosure, the receiving of the tune-away information may include receiving tune-away end information of the user equipment and the determining of the frame type may include determining a key frame type as a frame type of a transmission image when the tune-away end information is received.

According to various embodiments of the present disclosure, the receiving of the tune-away information may include receiving information of a tune-away expected end time of the user equipment and the determining of the frame type may include determining a key frame type as a frame type of a transmission image when the expected end time elapses.

Additionally, the method may further include, when the transmission image of the key frame type is generated after the end information is received, generating the next image in predicted frame type.

Figure 8:
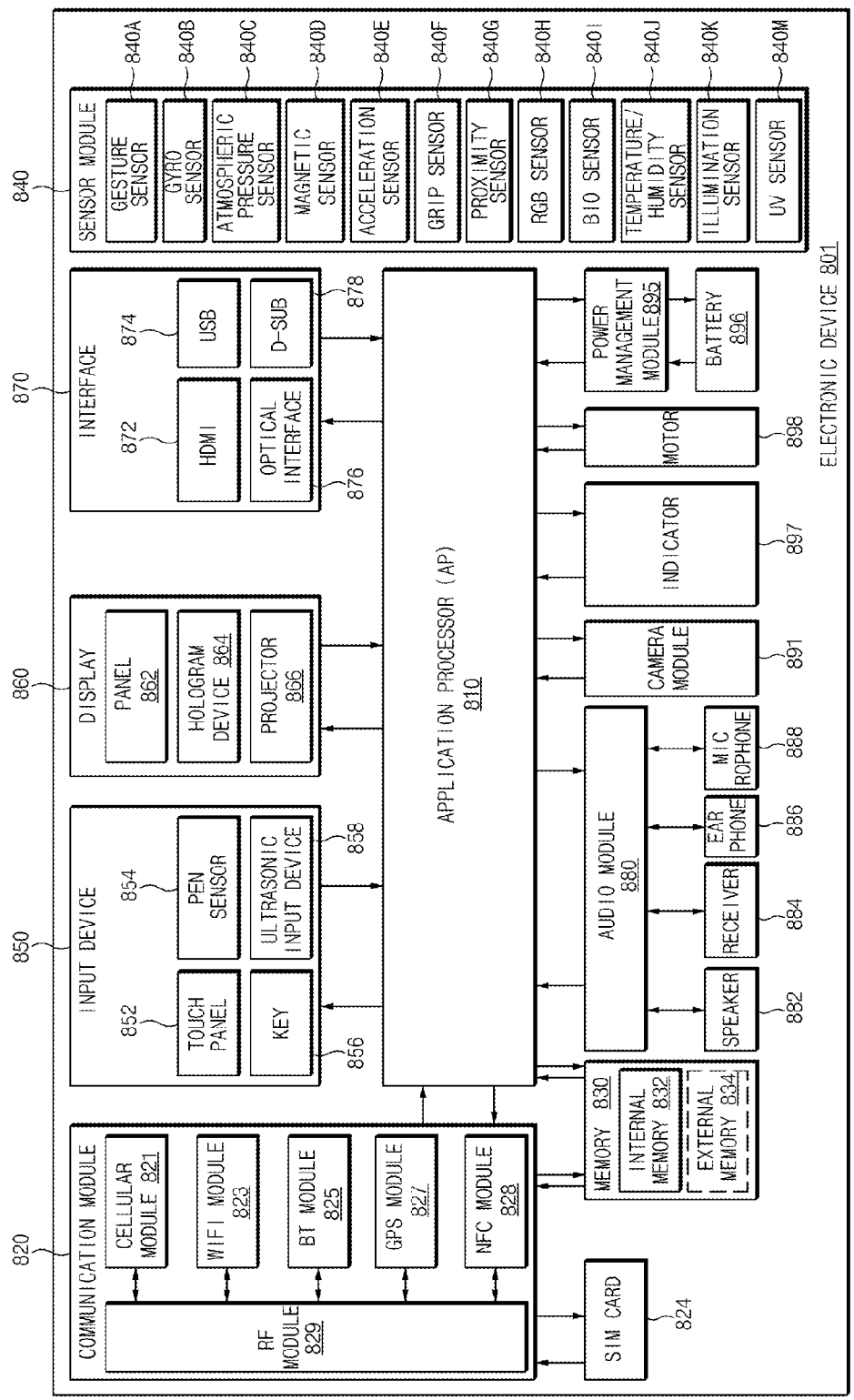
FIG. 8 is a block diagram of an electronic device according to various embodiments of the present disclosure.

FIG. 8 is a block diagram of an electronic device according to various embodiments of the present disclosure.

Referring to FIG. 8, an electronic device 801 may configure all or part of the above-mentioned electronic device 401 shown in FIG. 4. The electronic device 801 may include at least one processor (for example, an application processor (AP) 810), a communication module 820, a subscriber identification module (SIM) 824, a memory 830, a sensor module 840, an input device 850, a display 860, an interface 870, an audio module 880, a camera module 891, a power management module 895, a battery 896, an indicator 897, and a motor 898.

The processor 810 may control a plurality of hardware or software components connected thereto and also may perform various data processing and operations by executing an operating system or an application program. The processor 810 may be implemented with a system on chip (SoC), for example. According to an embodiment of the present disclosure, the processor 810 may further include a graphic processing unit (GPU) (not shown) and/or an image signal processor (not shown). The processor 810 may include at least some (for example, the cellular module 821) of components shown in FIG. 8. The processor 810 may load commands or data received from, for example, a non-volatile portion of the memory 830 and process them and may store various data in a non-volatile portion of the memory 830.

The communication module 820 may be similar to the communication interface 470 of FIG. 4. The communication module 820 may include a cellular module 821, a WiFi module 823, a BT module 825, a GPS module 827, an NFC module 828, and a radio frequency (RF) module 829.

The cellular module 821 may provide, for example, voice call, video call, text service, or internet service through a communication network such as the network 462. According to an embodiment of the present disclosure, the cellular module 821 may perform a distinction and authentication operation on the electronic device 801 in a communication network by using the SIM 824. According to an embodiment of the present disclosure, the cellular module 821 may perform at least part of a function that the processor 810 provides. According to an embodiment of the present disclosure, the cellular module 821 may further include a communication processor (CP) (not shown).

Each of the WiFi module 823, the BT module 825, the GPS module 827, and the NFC module 828 may include a processor for processing data transmitted/received through a corresponding module. According to an embodiment of the present disclosure, at least part (for example, at least one) of the cellular module 821, the WiFi module 823, the BT module 825, the GPS module 827, and the NFC module 828 may be included in one integrated chip (IC) or IC package.

The RF module 829 may transmit/receive communication signals such as, for example, RF signals. The RF module 829, for example, may include a transceiver, a power amp module (PAM), a frequency filter, a low noise amplifier (LNA), and/or an antenna. According to another embodiment of the present disclosure, at least one of the cellular module 821, the WiFi module 823, the Bluetooth module 825, the GPS module 827, and the NFC module 828 may transmit/receive RF signals through a separate RF module (not shown).

The SIM 824 may include, for example, a card including a SIM and/or an embedded SIM and also may include unique identification information (for example, an integrated circuit card identifier (ICCID)) or subscriber information (for example, an international mobile subscriber identity (IMSI)).

The memory 830 (for example, the memory 430) may include an internal memory 832 and/or an external memory 834. The internal memory 832 may include at least one of a volatile memory (for example, dynamic RAM (DRAM), static RAM (SRAM), synchronous dynamic RAM (SDRAM)) and a non-volatile memory (for example, one time programmable ROM (OTPROM), programmable ROM (PROM), erasable and programmable ROM (EPROM), electrically erasable and programmable ROM (EEPROM), mask ROM, flash ROM, flash memory (for example, NAND flash memory or NOR flash memory), hard drive, or solid state drive (SSD)).

The external memory 834 may include flash drive such as, for example, compact flash (CF), secure digital (SD), micro Micro-SD, Mini-SD, extreme digital (xD), (MultiMediaCard (MMC), or a memorystick. The external memory 834 may be functionally and/or physically connected to the electronic device 801 through various interfaces.

The sensor module 840 measures physical quantities or detects an operating state of the electronic device 801, thereby converting the measured or detected information into electrical signals. The sensor module 840 may include at least one of a gesture sensor 840A, a gyro sensor 840B, a barometric pressure sensor 840C, a magnetic sensor 840D, an acceleration sensor 840E, a grip sensor 840F, a proximity sensor 840G, a color sensor 840H (for example, a red, green, blue (RGB) sensor), a biometric sensor 840I, a temperature/humidity sensor 840J, an illumination sensor 840K, and an ultra violet (UV) sensor 840M. Additionally or alternatively, the sensor module 840 may include an E-nose sensor, an electromyography (EMG) sensor, an electroencephalogram (EEG) sensor, an electrocardiogram (ECG) sensor, an infrared (IR) sensor, an iris sensor, or a fingerprint sensor. The sensor module 840 may further include a control circuit for controlling at least one sensor therein. According to an embodiment of the present disclosure, a processor configured to control the sensor module 840 may be part of the processor 810. Alternatively, the processor configured to control the sensor module 840 may be separate from the processor 810. In either case, the processor configured to control the sensor module 840 may operate even when the circuitry of the processor 810 not used to control the sensor module 840 is in a sleep state.

The input device 850 may include a touch panel 852, a (digital) pen sensor 854, a key 856, or an ultrasonic input device 858. The touch panel 852 may use, for example, at least one of capacitive, resistive, infrared, or ultrasonic methods. Additionally, the touch panel 852 may further include a control circuit. The touch panel 852 may also include a tactile layer to provide tactile response to a user.

The (digital) pen sensor 854 may include, for example, a sheet for recognition as part of a touch panel or a separate sheet for recognition. The key 856 may include a physical button, an optical key, or a keypad, for example. The ultrasonic input device 858 may detect ultrasonic waves generated from an input tool through a microphone (for example, the microphone 888) in order to check data corresponding to the detected ultrasonic waves.

The display 860 (for example, the display 460) may include a panel 862, a hologram device 864, and/or a projector 866. The panel 862 may have the same or similar configuration to the display 460 of FIG. 4. The panel 862 may be implemented to be, for example, flexible, transparent, and/or wearable. The panel 862 and the touch panel 852 may be configured as one module. The hologram device 864 may project three-dimensional images in the air. The projector 866 may display an image by projecting light on a screen. The screen, for example, may be placed inside or outside the electronic device 801. According to an embodiment of the present disclosure, the display 860 may further include a control circuit for controlling the panel 862, the hologram device 864, or the projector 866.

The interface 870 may include, for example, a high-definition multimedia interface (HDMI) 872, a universal serial bus (USB) 874, an optical interface 876, and/or a D-subminiature (sub) 878. The interface 870 may be included, for example, in the communication interface 470 shown in FIG. 4. Additionally or alternatively, the interface 870 may include a mobile high-definition link (MHL) interface, a secure Digital (SD) card/multi-media card (MMC) interface, or an infrared data association (IrDA) standard interface.

The audio module 880 may convert sound into electrical signals and convert electrical signals into sounds. At least some components of the audio module 880, for example, may be included in the input/output interface 450 shown in FIG. 4. The audio module 880 may process sound information inputted/outputted through a speaker 882, a receiver 884, an earphone 886, or a microphone 888.

The camera module 891, a device for capturing still images and video, may include at least one image sensor (for example, a front sensor and/or a rear sensor), a lens (not shown), an image signal processor (ISP) (not shown), and/or a flash (not shown) (for example, an LED or a xenon lamp).

The power management module 895 may manage the power of the electronic device 801. According to an embodiment of the present disclosure, the power management module 895 may include, for example, a power management IC (PMIC), a charger IC, and/or a battery gauge. The PMIC may support a wired and/or a wireless charging methods. As the wireless charging method, for example, there is a magnetic resonance method, a magnetic induction method, or an electromagnetic method. An additional circuit for wireless charging, for example, a circuit such as a coil loop, a resonant circuit, or a rectifier circuit, may be added. The battery gauge may measure the remaining amount of the battery 896, or a voltage, current, or temperature thereof during charging. The battery 896, for example, may include a rechargeable battery and/or a solar battery.

The indicator 897 may display a specific state of the electronic device 801 or part thereof (for example, the processor 810), for example, a booting state, a message state, or a charging state. The motor 898 may convert electrical signals into mechanical vibration and may generate vibration or haptic effect. Although not shown in the drawings, the electronic device 801 may include a processing device (for example, a GPU) for mobile TV support. A processing device for mobile TV support may process media data according to the standards such as digital multimedia broadcasting (DMB), digital video broadcasting (DVB), or mediaFLO.

Each of the above-mentioned components of the electronic device according to various embodiments of the present disclosure may be configured with at least one component and the name of a corresponding component may vary according to the kind of an electronic device. According to various embodiments of the present disclosure, an electronic device according to various embodiments of the present disclosure may include at least one of the above-mentioned components, may not include some of the above-mentioned components, or may further include another component. Additionally, some of components in an electronic device according to various embodiments of the present disclosure are configured as one entity, so that functions of previous corresponding components are performed identically.

In relation to the configuration of FIG. 8, an electronic device may have a configuration including a processor (for example, the AP 810), a memory (for example, the memory 830), and a communication module (for example, the communication module 820). According to various embodiments of the present disclosure, an electronic device may include a processor, a memory, and a communication module configured to support a packet-switched (PS) and circuit-switched (CS) system communication network, wherein when the communication module performs a tune-away operation for receiving CS paging information, the memory being executed by the processor includes an instruction for transmitting information on the tune-away to a user equipment in a video call by the PS system.

According to various embodiments of the present disclosure, the information on the tune-away may include start information of the tune-away or end information of the tune-away. Additionally, the information on the tune-away may include at least one of an expected end time point of the tune-away, an average tune-away period, and a minimum tune-away period in addition to the start information of the tune-away.

According to various embodiments of the present disclosure, the processor may store a period of tune-away occurring from the electronic device and an average of the period in the memory.

According to various embodiments of the present disclosure, the electronic device may further include a plurality of reception antennas electrically connected to the communication module and at least one of the plurality of reception antennas may be set to receive a signal of the PS system communication network when the tune-away operation is performed.

Figure 9:
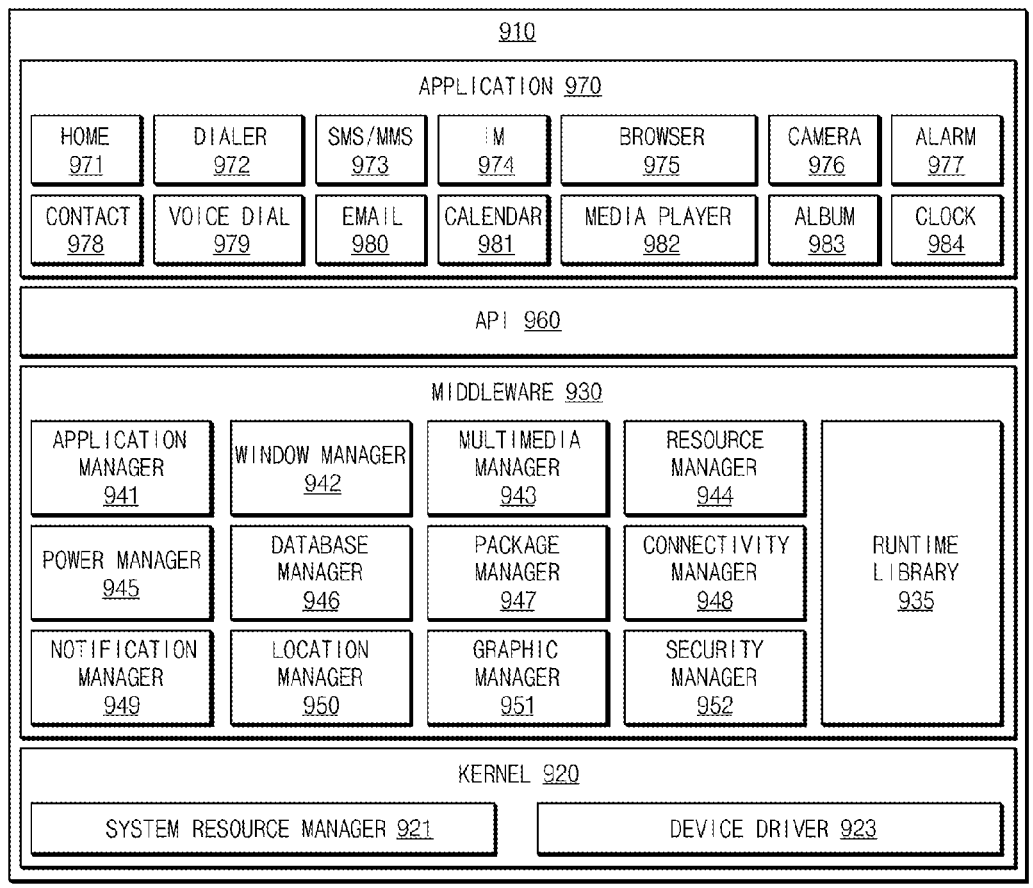
FIG. 9 is a block diagram of a program module according to various embodiments of the present disclosure.

FIG. 9 is a block diagram of a program module according to various embodiments of the present disclosure.

Referring to FIG. 9, according to an embodiment of the present disclosure, a program module 910 (for example, the program 440) may include an operating system (OS) for controlling a resource relating to an electronic device (for example, the electronic device 401) and/or various applications (for example, the application program 447) running on the OS.

The program module 910 may include a kernel 920, a middleware 930, an API 960, and/or an application 970. At least part of the program module 910 may be preloaded on an electronic device or may be downloaded from a server (for example, the electronic devices 402 and 404 and the server device 406).

The kernel 920 (for example, the kernel 441), for example, may include a system resource manager 921, or a device driver 923. The system resource manager 921 may perform the control, allocation, or retrieval of a system resource. According to an embodiment of the disclosure, the system resource manager 921 may include a process management unit, a memory management unit, or a file system management unit. The device driver 923, for example, may include a display driver, a camera driver, a Bluetooth driver, a sharing memory driver, a USB driver, a keypad driver, a WiFi driver, an audio driver, or an inter-process communication (IPC) driver.

The middleware 930, for example, may provide a function that the application 970 requires commonly, or may provide various functions to the application 970 through the API 960 in order to allow the application 970 to efficiently use a limited system resource inside the electronic device. According to an embodiment of the disclosure, the middleware 930 (for example, the middleware 443) may include at least one of a runtime library 935, an application manager 941, a window manager 942, a multimedia manager 943, a resource manager 944, a power manager 945, a database manager 946, a package manager 947, a connectivity manager 948, a notification manager 949, a location manager 950, a graphic manager 951, and a security manager 952.

The runtime library 935, for example, may include a library module that a compiler uses to add a new function through a programming language while the application 970 is running. The runtime library 935 may perform a function on input/output management, memory management, or an arithmetic function.

The application manager 941, for example, may mange the life cycle of at least one application among the applications 970. The window manager 942 may manage a GUI resource used in a screen. The multimedia manager 943 may recognize a format for playing various media files and may encode or decode a media file by using the codec corresponding to a corresponding format. The resource manager 944 may manage a resource such as a source code, a memory, or a storage space of at least any one of the applications 970.

The power manager 945, for example, may operate together with a basic input/output system (BIOS) to manage the battery or power and may provide power information necessary for an operation of the electronic device. The database manager 946 may create, search, or modify a database used in at least one application among the applications 970. The package manager 947 may manage the installation or update of an application distributed in a package file format.

The connectivity manger 948 may manage a wireless connection such as WiFi or Bluetooth. The notification manager 949 may display or notify an event such as arrival messages, appointments, and proximity alerts to a user in a manner of not interrupting the user. The location manager 950 may manage location information on an electronic device. The graphic manager 951 may manage a graphic effect to be provided to a user or a user interface relating thereto. The security manager 952 may provide various security functions necessary for system security or user authentication. According to an embodiment, when an electronic device (for example, the electronic device 401) includes a phone function, the middleware 930 may further include a telephony manager for managing a voice or video call function of the electronic device.

The middleware 930 may include a middleware module for forming a combination of various functions of the above-mentioned components. The middleware 930 may provide a module specialized for each type of OS to provide differentiated functions. Additionally, the middleware 930 may delete part of existing components or add new components dynamically.

The API 960 (for example, the API 445), for example, as a set of API programming functions, may be provided as another configuration according to OS. For example, in the case of android or iOS, one API set may be provided for each platform and in the case Tizen, at least two API sets may be provided for each platform.

The application 970 (for example, the application program 447) may include at least one application for providing functions such as a home 971, a dialer 972, an SMS/MMS 973, an instant message 974, a browser 975, a camera 976, an alarm 977, a contact 978, a voice dial 979, an e-mail 980, a calendar 981, a media player 982, an album 983, a clock 984, health care (for example, measure an exercise amount or blood sugar), or environmental information provision (for example, provide air pressure, humidity, or temperature information).

According to an embodiment, the application 970 may include an application (hereinafter referred to as "information exchange application") for supporting information exchange between the electronic device (for example, the electronic device 401) and an external electronic device (for example, the electronic devices 402 and 404). The information exchange application, for example, may include a notification relay application for relaying specific information to the external device or a device management application for managing the external electronic device.

For example, the notification relay application may have a function for relaying to an external electronic device (for example, electronic devices 402 and 404) notification information occurring from another application (for example, an SMS/MMS application, an e-mail application, a health care application, or an environmental information application) of the electronic device. Additionally, the notification relay application may receive notification information from an external electronic device and may then provide the received notification information to a user.

The device management application, for example, may manage (for example, install, delete, or update) at least one function (turn-on/turn off of the external electronic device itself (or some components) or the brightness (or resolution) adjustment of a display) of an external electronic device (for example, the electronic devices 402 and 404) communicating with the electronic device, an application operating in the external electronic device, or a service (for example, call service or message service) provided from the external device.

According to an embodiment of the disclosure, the application 970 may include a specified application (for example, a health care application of a mobile medical device) according to the property of an external electronic device (for example, the electronic devices 402 and 404). According to an embodiment, the application 970 may include an application received from an external electronic device (for example, the server 406 or the electronic device 402 or 404). According to an embodiment of the disclosure, the application 970 may include a preloaded application or a third party application downloadable from a server. The names of components in the program module 910 according to the shown embodiment may vary depending on the type of OS.

According to various embodiments of the present disclosure, at least part of the program module 910 may be implemented with software, firmware, hardware, or a combination thereof. At least part of the program module 910, for example, may be implemented (for example, executed) by a processor (for example, the processor 810). At least part of the program module 910 may include a module, a program, a routine, sets of instructions, or a process to perform at least one function, for example.

According to various embodiments of the present disclosure, in relation to a high quality video call using a PS type network such as VoLTE based video call, even when a terminal performs a tune-away operation for receiving CS paging information, the influence of LTE data throughput deterioration caused by the tune-away operation may be minimized and a high-quality video call may be maintained.

The term "module" used in various embodiments of the present disclosure, for example, may mean a unit including a combination of at least one of hardware, software, and/or firmware. The terms "module", "unit", "logic", "logical block", "component", or "circuit" may be interchangeably used. A "module" may be a minimum unit or part of an integrally configured component. A "module" may be a minimum unit performing at least one function or part thereof. A "module" may be implemented mechanically or electronically. For example, "module" according to various embodiments of the present disclosure may include at least one of, for example, an application-specific integrated circuit (ASIC) chip performing certain operations, field-programmable gate arrays (FPGAs), a programmable-logic device, and other modules applicable to the various embodiments of the disclosure known to one of an ordinary skill in the art, as well as other applicable modules that may be developed in the future.

According to various embodiments of the present disclosure, at least part of a device (for example, modules or functions thereof) or a method (for example, operations) according to this disclosure, for example, as in a form of a programming module, may be implemented using an instruction stored in computer-readable storage media. When at least one processor (for example, the processor 420) executes an instruction, it may perform a function corresponding to the instruction. The non-transitory computer-readable storage media may include the memory 430, for example.

The non-transitory computer-readable storage media may include hard disks, floppy disks, magnetic media (for example, magnetic tape), optical media (for example, CD-ROM, and DVD), magneto-optical media (for example, floptical disk), and hardware devices (for example, ROM, RAM, or flash memory). Additionally, a program instruction may include high-level language code executable by a computer using an interpreter in addition to machine code created by a compiler. The hardware device may be configured to operate as at least one software module to perform an operation of various embodiments of the present disclosure and vice versa.

A module or a programming module according to various embodiments of the present disclosure may include at least one of the above-mentioned components, may not include some of the above-mentioned components, or may further include another component. Operations performed by a module, a programming module, or other components according to various embodiments of the present disclosure may be executed through a sequential, parallel, repetitive or heuristic method. Additionally, some operations may be executed in a different order or may be omitted. Or, other operations may be added.

Moreover, the embodiments disclosed in this specification are suggested for the description and understanding of technical content but do not limit the range of the present disclosure. Accordingly, the range of the present disclosure should be interpreted as including all modifications or various other embodiments based on the technical idea of the present disclosure.

What is claimed:

1. An electronic device comprising:
   a communication module configured to connect a packet-based video call to a user equipment (UE);
   an image processing module configured to generate a transmission image for the packet-based video call; and
   a control module configured to control a frame type of the transmission image generated by the image processing module based on tune-away information received from the user equipment.

2. The electronic device of claim 1, wherein the tune-away information comprises tune-away start information of the user equipment, and
   wherein the control module is further configured to generate the transmission image in predicted frame (P frame) type from a time point of obtaining the tune-away start information.

3. The electronic device of claim 2, wherein the tune-away information comprises tune-away end information of the user equipment, and
   wherein the control module is further configured to generate the transmission image in intra frame (I frame) type and to transmit the transmission image generated to the user equipment when the tune-away end information is obtained.

4. The electronic device of claim 2, wherein the tune-away information comprises information on a tune-away average end time of the user equipment and the control module generates the transmission image in I frame type when the tune-away average end time elapses.

5. The electronic device of claim 2, wherein the tune-away information comprises information on a tune-away expected end time of the user equipment and the control module generates the transmission image in I frame type when the tune-away expected end time elapses.

6. The electronic device of claim 5, wherein the control module generates a subsequent transmission image in P frame type after generating the transmission image in I frame type.

7. The electronic device of claim 1, wherein the tune-away information comprises tune-away start information of the user equipment and information on the user equipment and when the user equipment is a Single Radio LTE (SR-LTE) supporting terminal, the control module generates the transmission image in I frame type from a time point of obtaining the tune-away start information.

8. The electronic device of claim 7, wherein when receiving tune-away end information from the user equipment, the control module generates the transmission image in I frame type to transmit the transmission image generated to the user equipment and generates a subsequent transmission image in a referring frame type after the transmission.

9. The electronic device of claim 1, wherein the tune-away information comprises a tune-away start information of the user equipment and information on the user equipment, and when the user equipment is a Single Radio Dual Standby (SRDS) supporting terminal, the control module generates the transmission image in referring frame type from a time point of obtaining the tune-away start information.

10. The electronic device of claim 9, wherein when the user equipment is an SRDS supporting terminal, if an expected end time of the tune-away elapses or tune-away end information is received, the control module generates the transmission image in I frame type to transmit the transmission image generated to the user equipment.

11. An electronic device comprising:
    a processor:
    a memory; and
    a communication module configured to support a packet-switched (PS) network and a circuit-switched (CS) network,
    wherein when the communication module performs a tune-away operation for receiving CS paging information, instructions stored in the memory being executed by the processor comprises an instruction for transmitting tune-away information on the tune-away operation to a user equipment in a video call by the PS network.

12. The electronic device of claim 11, wherein the tune-away information comprises at least one of tune-away start information and tune-away end information.

13. The electronic device of claim 12, the tune-away information comprises at least one of an expected end time point of the tune-away operation, an average tune-away period, and a minimum tune-away period in addition to the tune-away start information.

14. The electronic device of claim 11, wherein the processor stores in the memory a period for at least one tune-away performed by the electronic device and an average of the period stored in the memory for the tune-away operation.

15. The electronic device of claim 11, further comprising a plurality of reception antennas electrically connected to the communication module and at least one of the plurality of reception antennas is set to receive a signal of the PS network when the tune-away operation is performed.

16. A video call method comprising:
    connecting a packet based video call between a first user equipment and a second user equipment;
    receiving tune-away information at the first user equipment from the second user equipment; and
    determining a frame type of a transmission image to be transmitted to the second user equipment based on the tune-away information received.

17. The method of claim 16, wherein receiving the tune-away information comprises receiving tune-away start information of the second user equipment and the determining of the frame type comprises determining a predicted frame (P frame) type as the frame type of the transmission image when the tune-away start information is received.

18. The method of claim 17, wherein the receiving of the tune-away information comprises receiving information of a tune-away expected end time of the second user equipment and the determining of the frame type comprises determining I frame type as the frame type of the transmission image when the tune-away expected end time elapses.

19. The method of claim 17, wherein the receiving of the tune-away information comprises receiving tune-away end information of the second user equipment and the determining of the frame type comprises determining I frame type as the frame type of the transmission image when the tune-away end information is received.

20. The method of claim 19, further comprising, when the transmission image of the I frame type is generated after the tune-away end information is received, generating the next image in P frame type.

* * * * *